United States Patent
Ostrowsky et al.

[11] 3,977,763
[45] Aug. 31, 1976

[54] COUPLING DEVICE FOR AN OPTICAL WAVEGUIDE AND A METHOD FOR MANUFACTURING SUCH A DEVICE

[75] Inventors: Daniel Ostrowsky; André Jacques; Michel Papuchon, all of Paris, France

[73] Assignee: Thomson-CSF, Paris, France

[22] Filed: Mar. 12, 1975

[21] Appl. No.: 557,781

Related U.S. Application Data

[62] Division of Ser. No. 365,976, June 1, 1973, Pat. No. 3,885,856.

[30] Foreign Application Priority Data
June 7, 1972 France .................. 72.20423

[52] U.S. Cl. .................. 350/96 C; 350/3.5
[51] Int. Cl.² .................. G02B 5/14; G02B 5/32
[58] Field of Search ........ 350/96 WG, 96 C, 3.5, 350/162 R

[56] References Cited
UNITED STATES PATENTS
| | | | |
|---|---|---|---|
| 3,809,455 | 5/1974 | Pekau et al. | 350/96 WG |
| 3,864,016 | 2/1975 | Dakss et al. | 350/96 WG |

*Primary Examiner*—Ronald J. Stern
*Attorney, Agent, or Firm*—Cushman, Darby & Cushman

[57] ABSTRACT

The invention relates to a coupling device for an optical waveguide, using a hologram recorded in a photoresist layer arranged on a face of the waveguide, and capable of coupling a wave having a predetermined wafe front and travelling outside the waveguide and a plane wave travelling inside the guide. The invention also describes a holographic method for manufacturing such a coupling device.

2 Claims, 5 Drawing Figures

COUPLING DEVICE FOR AN OPTICAL WAVEGUIDE AND A METHOD FOR MANUFACTURING SUCH A DEVICE

This is a division, of application Ser. No. 365,976 filed June 1, 1973 now U.S. Pat. No. 3,885,856.

Those skilled in the art will be aware that an optical waveguide conducts lightrays due to total reflection of the latter at the two flat diopters delimiting it.

The angle of incidence $\theta$ of the light, which is greater than the limiting total reflection angles, should, moreover, belong to a discrete and finite series of angles $\theta_o$, ... $\theta_p$. This sequence is determined by the waveguide height, the wavelength of the light and the various refractive indices of the material of which the waveguide proper is made and the external media which delimits its two diopters.

With each angle $\theta_m$ there corresponds a propagation mode affected by very low losses.

The phenomenon of total reflection, which is essential to the propagation of light through a waveguide, poses a problem as far as the entry of the light into the waveguide is concerned. This problem is that of coupling.

There are a certain number of methods of coupling amongst which the method of coupling by grating is one. This method consists in inscribing a grating in a film of photosensitive material previously deposited upon the waveguide. The pitch of the grating and the angle of incidence of a virtually flat wave, are such that one of the diffraction orders (generally the order 1) inside the waveguide, corresponds to a propagation mode $m$.

However, this method as well as the others currently in use, requires operation with a virtually plane incident wave in order to achieve propagation in a single mode of a substantial fraction of the energy. In other words, graphs which plot the variations in the coupled intensity, as a function of the angle of incidence, have amid-height width of less than 6 minutes.

The object of the present invention is to overcome the drawback referred to hereinbefore and to provide a coupling device for an optical waveguide, which makes it possible, equally, to use an incident beam which is convergent or divergent in order, within the waveguide, to obtain a virtually plane wave having the direction of propagation required for the excitation of a given mode $m$.

The invention thus relates to a method of manufacturing an optical waveguide coupling device, characterised in that it consists in arranging opposite one face of the waveguide, a film of photosensitive material and in forming, in at least one region of said film, a hologram designed to convert an incident lightbeam into a plane wave whose propagation direction within the waveguide is that required to excite a predetermined mode in said waveguide.

The invention likewise relates to an optical waveguide coupling device, produced by the method defined hereinbefore.

Other features of the invention will become apparent in the course of the ensuing description.

According to the present invention, there is provided: a coupling device for an optical waveguide capable of conjugating a non-plane electro-magnetic wave of wavelength $\lambda_1$ propagating outside said waveguide and a substantially plane electro-magnetic wave propagating at an angle inside said waveguide, said device comprising at least one hologram arranged on a face of said waveguide.

According to the present invention, there is also provided: a method for manufacturing a coupling device for an optical waveguide;

said coupling device being capable of conjugating a nonplane electro-magnetic wave of wavelength $\lambda_1$ propagating outside said waveguide and a substantially plane electro-magnetic wave propagating at an angle inside said waveguide and comprising at least one hologram arranged on a face of said waveguide;

said method consisting in arranging on said face a layer of photosensitive material and in recording a hologram in at least one region of said layer;

said hologram resulting from the interference of a first and a second recording electro-magnetic wave of wavelength $\lambda_0$;

said first recording wave being substantially spherical and said second recording wave having the same position in relation to said waveguide and the same wave front as the non-plane electro-magnetic wave propagating outside the waveguide;

the center of said spherical first recording wave being positioned for said hologram to conjugate said nonplane wave propagating outside said waveguide and said substantially plane wave propagating inside said waveguide.

For a better understanding of the invention, and to show how the same may be carried into effect, reference will be made to the ensuing description and the attached figures, among which:

Figure 1:
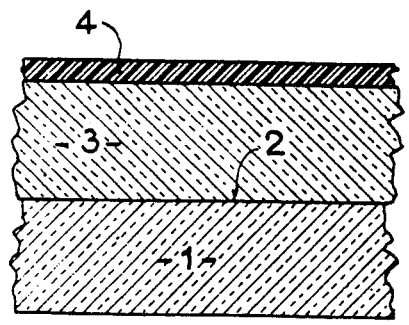
FIGS. 1 and 2 illustrate the steps in the manufacture of the optical waveguide coupling device in accordance with the invention.

Referring to FIG. 1, the optical waveguide is constituted by a substrate 1 upon the top face 2 of which there is deposited a plate 3 constituting the optical waveguide medium proper. On that face of the plate 3 disposed away from the substrate 1, there is deposited a film 4 of photosensitive material. The film can be deposited directly upon the plane 3, in the manner shown in FIG. 1, or upon an intermediate plane of refractive material in contact with the plate 3.

Figure 2:
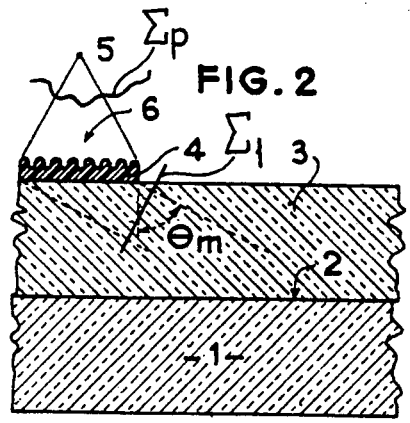

Let us assume that it is desired to excite the waveguide using a divergent beam whose wave front is indicated as $\Sigma_p$ coming from a source 5 (FIG. 2). The source 5 having been taken to be the object source, it is necessary to determine exactly what reference beam is required to record a hologram which will ensure transformation of the divergent beam into a plane wave with a wave front $\Sigma_1$ of suitable propagation direction through the waveguide 3.

To this end, use is made of the relationships which take account of the fact that the refractive index of the image medium, that is to say of the waveguide 3, differs from that of the object medium which is constituted by air.

Generally speaking, the wavelength utilised for coupling will differ from the wavelength which corresponds to best sensitivity on the part of photosensitve material. It is for this reason that the relationships indicated herebelow have been chosen, which assume the two wavelengths to differ.

$\lambda_0$ is the wavelength of recording of the hologram;

$\lambda_1$ is the reconstitution wavelength, that is to say that of the light applied to the waveguide after the formation of the hologram;

$$\lambda_2 = \frac{\lambda_1}{n}$$

is the reconstitution wavelength in a medium of refractive index $n$.

The polar coordinates $S_1$, $\phi_1$ of the normal image provided by a hologram are defined by the relationships:

$$\frac{1}{S_1} = \frac{2}{\lambda_0}\left(\frac{1}{S_o} - \frac{1}{S_p}\right) + \frac{\lambda_2}{\lambda_1}\frac{1}{S_R}$$

$$\sin \phi_1 = \frac{\lambda_2}{\lambda_0}(\sin \phi_o - \sin \phi_p) + \frac{\lambda_2}{\lambda_1}\sin \phi_R$$

Figure 3:
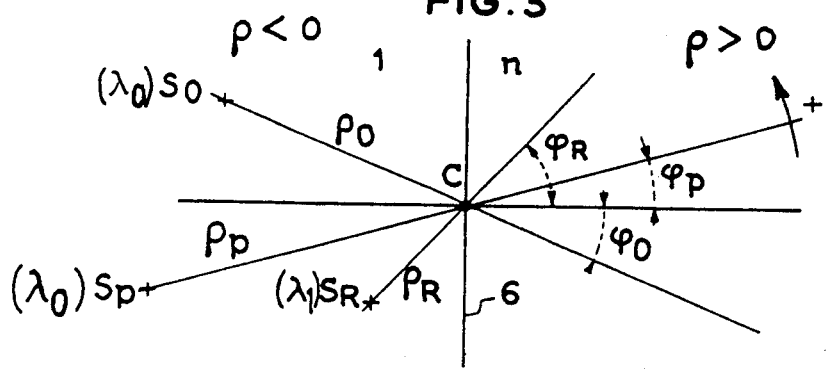
FIG. 3 is a diagram based upon polar coordinates, showing the positions of the various light sources designed to record a hologram upon a waveguide and to reconstitute, through the hologram, the light which is to propagate through the waveguide.

As shown by the diagram of FIG. 3, which also specifies the sign conventions, $S_o$, $\phi_o$ and $S_p$, $\phi_p$ are respectively the polar coordinates of the light sources $S_o$ (object source) and $S_p$ (reference source) utilised for the recording of the hologram 6, while $S_R$, $\phi_R$ are the polar coordinates of the light source $S_R$ illuminating the hologram thus recorded; $S_1$, $\phi_1$ are then the coordinates of the image of the light source $S_R$ provided by the hologram 6.

In FIG. 3, it can be seen that the hologram 6 is arranged on the diopter which separates the air of refractive index 1 from the material of the waveguide 3, which has a refractive index n. The point C, centre of the hologram 6 is considered as the origin of the distances S, and a straight line, perpendicular in C to the diopter, as the origin of the angles $\phi$.

To deduce, for the above relationships, the values of $S_o$, $\phi_o$ determining the position of the light source $S_o$, it will be borne in mind that:
 i. the wave travelling in the waveguide must be plane, which imposes $1/\rho_1 = 0$;
 ii. the angle $\phi_1$ must be one of the angles of the finite series $\theta_o, \ldots, \theta_p$ above mentioned, which imposes $\phi_1 = \theta_m$ (coupling condition for the mode $m$).

Besides, as hereinafter shown by FIG. 4 and FIG. 5, the positions of the light sources $S_p$ (utilised for the recording of the hologramp and $S_R$ (utilised for illuminating the hologram) are the same vis-a-vis with the waveguide, which leads to $S_p = S_R$ and $\phi_p = \phi_R$.

Figure 4:
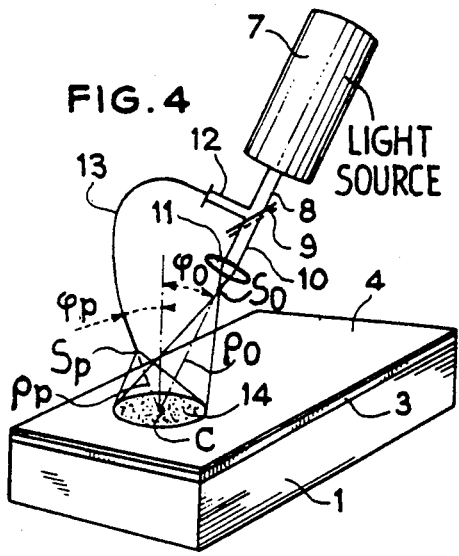
FIG. 4 is a schematic perspective view of an assembly for recording a hologram intended to provide coupling for a waveguide.
Figure 5:
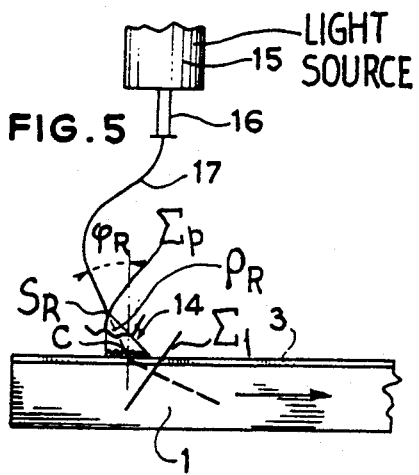
FIG. 5 is a schematic view illustrating the operation of the coupling device in accordance with the invention.

To effect recording of the hologram, the assembly shown in FIG. 4 is used.

Assume, for example, that it is desired to couple an optical fibre 5 microns in diameter with the fundamental mode ($m = o$) of a dielectric waveguide.

To effect recording, an argon laser with an operating wavelength of $\lambda_o = 0.4579$ $\mu$, is used.

One knows, too, that the waveguide is to be coupled with a fibre transmitting light coming from a helium-neon laser with an operating wavelength of $\lambda_1 = 0.6328$ $\mu$.

Also knowing the refractive index of air $n_2 = 1.000$, that of the waveguide $n_1 = 1.595$, that of the substrate $n_o = 1.515$ and the angle of propagation of the fundamental $\theta_o = 80°$, as well as the thickness of the waveguide $W = 0.9$ $\mu$, and imposing the following conditions:

the propagation mode must be the fundamental one, that is to say:

$$\phi_1 = \theta_o = 80°;$$

the axes of the beams $S_oP$ and $S_oC$ must be arranged symmetrically with each other in regard of the perpendicular in C to the diopter, that is to say:

$$\phi_P = \phi_R = -\phi_o;$$
$$-S_P = S_R = 1 \text{ cm};$$

One can then deduce from the hereinabove relationships the values:

$$\phi_o = -\phi_P = -\phi_R = 24° 40'$$
$$S_oC = S_o = 3.57 \text{ cm}$$

which define the conditions under which to record the hologram.

The photosensitive material utilised will, for example, be Shipley AZ 1350 positive photoresist, the refractive index of which is greater than the index $n_1$ of the guide.

Referring to the assembly shown in FIG. 4, an optical waveguide, constituted by a substrate 1 carrying a plate 3 constituting the waveguide proper, on the top face of which a film 4 of photosensitive material is deposited, is exposed to the light coming from an argon laser 7 whose beam 8 is split into two fractions by a partially reflective plate 9 disposed at 45° to the beam trajectory. That part 10 of the beam which has not been reflected by the plate, strikes a lense 11 which concentrates it at its focus $S_o$, this being located at a distance from the point C of the surface of the photosensitive film 4, equal to the value $\rho_o$, indicated hereinbefore.

That part 12 of the beam which is reflected by the plate 9, is picked up by an optical fibre 13 that of whose ends $S_P$ adjacent the waveguide is located at a distance from the point C of $\rho_p$.

The inclination of the axes of the two beam fractions (produced from beam 8) thus obtained, is equal respectively to $\phi_o$ and to $\phi_p$ so that the region 14 of the photosensitive material 4 is illuminated by two beams coming from two sources $S_o$ and $S_p$ which satisfy the conditions for the recording of the desired hologram.

The recording of the hologram having been achieved, the photosensitive material is developed, and the hologram 14 appears on the surface of the waveguide.

It was assumed that, to obtain the total reflection phenomenon necessary to the propagation of a mode, the waveguide refractive index was greater than those of the two neighbouring media. In the case where the refractive index of the photosensitive material, a photoresist for instance, is greater than that of the waveguide, there is the risk that the mode excited will propagate through the resist film. This drawback can be overcome by arranging that the photoresist, after development, remains only in the region of the hologram. Where the photoresist is negative, total reflection is ensured directly after development because the resist is automatically eliminated around the hologram. Where the photoresist is positive, it is merely necessary to preliminarily expose it in those regions where after development, is not wanted.

In both cases, the only part remaining from the photosensitive layer 4 is thus the zone 14 constituting the hologram.

The hologram 14 thus formed makes possible the coupling of an optical fibre with the fundamental mode of the waveguide. To this end, the arrangement of FIG. 5 is employed.

A helium-neon laser 15 emits a beam 16 which is picked up by an optical fibre 17 5 $\mu$ in diameter, whose end $S_R$ is arranged at a distance from the point C on the hologram 14, equal to $\rho_R$, the angle of incidence of the beam axis coming from the fibre 17 being equal to $\phi_R$.

The light from the laser 15 and issuing from the optical fibre 17 with the wave front $\Sigma_P$ is thus coupled into the waveguide, the hologram 14 converting it into a plane wave of wave front $\Sigma_1$ which propagates through the waveguide in the general direction indicated by the arrow.

The method of holographic coupling described, makes it possible to excite a given mode m in an optical waveguide, by means of a convergent, divergent and even highly divergent incident beam, a highly divergent beam being the current produced for example by a quasi-point optical fibre.

In the embodiment just described, the coupling device obtained is an input coupling device but it goes without saying that it is possible in the same fashion to produce an output coupling device for the waveguide.

What we claim is:

1. A coupling device for a plane optical waveguide capable of conjugating a non plane electro-magnetic wave propagating outside said waveguide and a substantially plane electro-magnetic wave propagating at an angle inside said waveguide, said device comprising at least one hologram arranged on a face of said waveguide, said hologram being recorded in a material having a refractive index greater than the refractive index of said waveguide.

2. A coupling device as claimed in claim 1, wherein said angle is the angle of travel corresponding to a propagation mode of said waveguide.

* * * * *